C. GIFFORD
Car-Coupling.

No. 8,392. Reissued Sept. 3, 1878.

*Witnesses.*
S. N. Piper
John Robinson

*Inventor,*
Charles Gifford.
by his attorney,
R. H. Eddy

N. PETERS, PHOTO-LITHOGRAPHER, WASHINGTON, D. C.

UNITED STATES PATENT OFFICE.

CHARLES GIFFORD, OF GARDINER, MAINE.

IMPROVEMENT IN CAR-COUPLINGS.

Specification forming part of Letters Patent No. 204,212, dated May 28, 1878; Reissue No. 8,392, dated September 3, 1878; application filed June 27, 1878.

*To all whom it may concern:*

Be it known that I, CHARLES GIFFORD, of Gardiner, of the county of Kennebec and State of Maine, have invented a new and useful Improvement in Railway-Carriage Couplings; and do hereby declare the same to be described in the following specification and represented in the accompanying drawings, of which—

Figure 1:
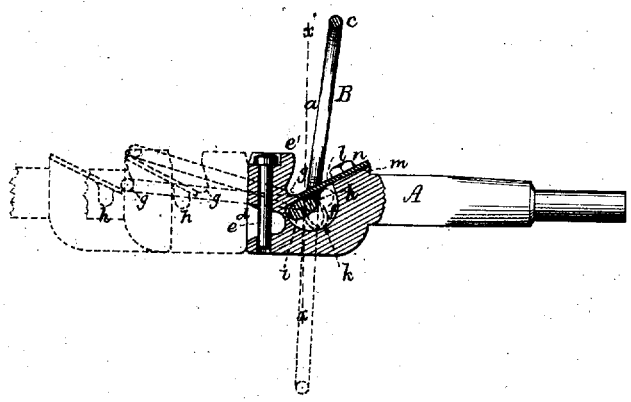
Figure 2:
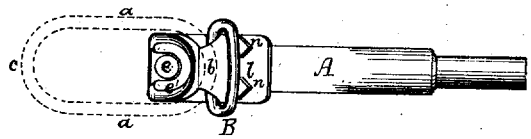
Figure 3:
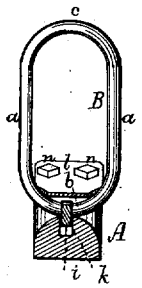

Figure 1 is a longitudinal section, Fig. 2 a top view, and Fig. 3 a transverse section, of a car-coupling draw-head and link provided with my invention, the plane of section of the latter figure being through the line *x x* of Fig. 1. In the said Fig. 1 the link is represented in full lines as turned up, and by dotted lines as in its lowermost and intermediate positions. Furthermore, Fig. 1 exhibits by dotted lines the position of a draw-head ready for being coupled, and also having been coupled by the link to its own draw-head. In Fig. 2 the link is shown by dotted lines in its horizontal position, while in Figs. 1, 2, and 3 it is exhibited by full lines as in its uppermost position.

The invention has reference to railway-car couplings of the class represented in Letters Patent of the United States numbered 19,925, and dated April 13, 1858, they having been granted to A. Hebbard. Such invention may be said to consist as follows: First, in a recessed draw-head provided with a hook or catch and with link arcal or semicircular heel and toe bearings, and having a projection separate from and to extend over the link-heel or through the link, as and for the purpose or purposes hereinafter specified; second, in the combination, with a coupling-link curved at its ends, as shown, and with a draw-head provided with a hook or catch, arranged as represented, of certain devices or their equivalents for guiding the link in its passage to, over, and around the catches or hooks during the process of connecting two draw-heads by such link.

For effecting the coupling of railway cars or carriages, the draw-head A and the link B are intended to co-operate with others of like kind, or with those having link-pins and receiving-mouths.

The link has parallel sides *a a*, and is semicircular at its heel *b* and toe *c*, or parts connected by the said sides.

The draw-head is represented as provided with a link mouth or chamber, *d*, and an ordinary coupling-pin, *e*, they being arranged as shown in Figs. 1 and 2, the pin being extended down through a coupling hook or catch, *e'*, projecting upward from the draw-head at its front part. In rear of the catch the draw-head is recessed, as represented at *f*, to receive the link-heel. At its base the catch has an arcal or semicircular bearing, *g*, for the toe portion of a link, when coupled with such catch, to rest or bear against.

Furthermore, there is below the bearing *g* and in the draw-head another such bearing, *h*, for the heel of the link to bear against. Each of these bearings is to so fit to the inner surface of the curved end of a link as to substantially prevent the link from collapsing transversely while in engagement with two draw-heads and one is being pulled in a direction away from the other.

Furthermore, in order to properly guide the link, either in its fall or rise, there is extended from its heel a projection, *i*, and there is made in the draw-head and bottom of its link-recess a straight groove, *k*, into which the projection *i* extends. This projection remains in the groove during the fall of the link to its intermediate position, as well as during its rise therefrom.

The object of the said devices—viz., the projection *i* and groove *k*—is to cause the link to move unerringly in a path such as will carry it in falling not only by and clear of the catch of its own draw-head, but over and so as to hook upon or engage with that of a draw-head to be coupled by it.

From the draw-head there extends over the heel of the link, or through the link when in its elevated position, a projection or plate, *l*, which, as shown in the drawings, is secured to an inclined seat, *m*, by means of screws *n n*, and inclines downward and terminates directly between the arcal bearings *g h*. This plate is curved on its opposite edges, as represented, for the purpose of aiding in guiding the link in its upward or downward movements, and also of supporting the link in its uppermost position. The plate also is for maintaining the link down within the link-recess of the draw-head and keeping the guide-projection *i* in the guide-groove *k*. It also serves to guide the link of an engaging draw-head to the round shoulder or toe-bearing *g*.

When one draw-head is caused to smartly impinge against another, end to end, the coupling-link of either that may be raised will, by its momentum, be projected forward, so as to hook upon or couple with the catch of the other.

What I claim as my invention is as follows, viz:

1. A recessed draw-head provided with a hook or catch, *e'*, and link arcal or semicircular heel and toe bearings *g h*, and having a projection, *l*, separate from the link, to extend over its heel or through the link, substantially as and for the purpose or purposes set forth.

2. In combination with a coupling-link, B, curved at its ends, as shown, and a draw-head provided with a coupling hook or catch, as set forth, devices for guiding the link in its movements, as explained, such devices being the projection *i* and groove *k*, arranged with the link and draw-head in manner as represented.

CHARLES GIFFORD.

Witnesses:
R. H. EDDY,
JOHN R. SNOW.